MAGNETIC CORE COUNTER CIRCUITS

Filed June 3, 1957 2 Sheets-Sheet 1

INVENTOR.
VERNON L. NEWHOUSE
BY Morris Lakin
ATTORNEY

Aug. 18, 1959 V. L. NEWHOUSE 2,900,626

MAGNETIC CORE COUNTER CIRCUITS

Filed June 3, 1957 2 Sheets-Sheet 2

INVENTOR.
VERNON L. NEWHOUSE
BY Morris A. Rabkin
ATTORNEY

United States Patent Office 2,900,626
Patented Aug. 18, 1959

2,900,626

MAGNETIC CORE COUNTER CIRCUITS

Vernon L. Newhouse, Haddonfield, N.J., assignor to Radio Corporation of America, a corporation of Delaware Application June 3, 1957, Serial No. 663,194

10 Claims. (Cl. 340—174)

This invention relates to counter circuits, and more particularly to counter circuits employing magnetic core elements.

Binary counter circuits using magnetic cores have been used which have the advantages of permanent storage of a count. The magnetic core elements are characterized by having two stable states of magnetization. After once being set, these core elements retain indefinitely the set state of magnetization without requiring supply power. However, magnetic core counters ordinarily employ two or more magnetic cores in each stage of the counter. Further, certain counter circuits which use a plurality of cores in each stage require additional circuit elements in any one stage to steer an input signal to a desired one of the cores of that one stage.

The speed of operation of certain prior-art counter circuits, both of the electronic and the magnetic types, is limited because an additional fixed time is required for a carry signal to propagate from the least significant stage to the most significant stage. Certain other of the prior-art counter circuits avoid the delay involved in carry propagation by using a number ($n-1$) of "and" gates each having $k$ inputs, where $n$ is the number of counter stages and $k$ is the stage number. However, such circuits are relatively complex and may require relatively large operating power, particularly when the counter has many stages.

It is an object of the present invention to provide improved magnetic counters which can be operated at relatively high speeds.

Another object of the present invention is to provide improved magnetic counter circuits, which circuits employ an electronic carry-propagating circuit for obtaining relatively high operating speeds.

Still another object of the present invention is to provide improved magnetic counter circuits combining the permanent storage features of a magnetic core counter and the high-speed operation of counters employing electronic elements.

A further object of the invention is to provide improved magnetic counter circuits which require fewer magnetic and electronic elements than certain prior counter circuits of similar type.

According to the invention, a counter circuit employing magnetic cores is provided with a carry propagation circuit. The carry propagation circuit is provided with a plurality of cascaded electronic carry stages, one for each counter stage. Each carry stage includes a multi-input "and" gate circuit for controlling the propagation of a carry signal applied to that stage. A carry signal output from one stage is used to control the states of the magnetic core elements of the one stage and the next succeeding stage, and further to control the carry "and" gate circuit of the next succeeding carry stage.

Figure 1:
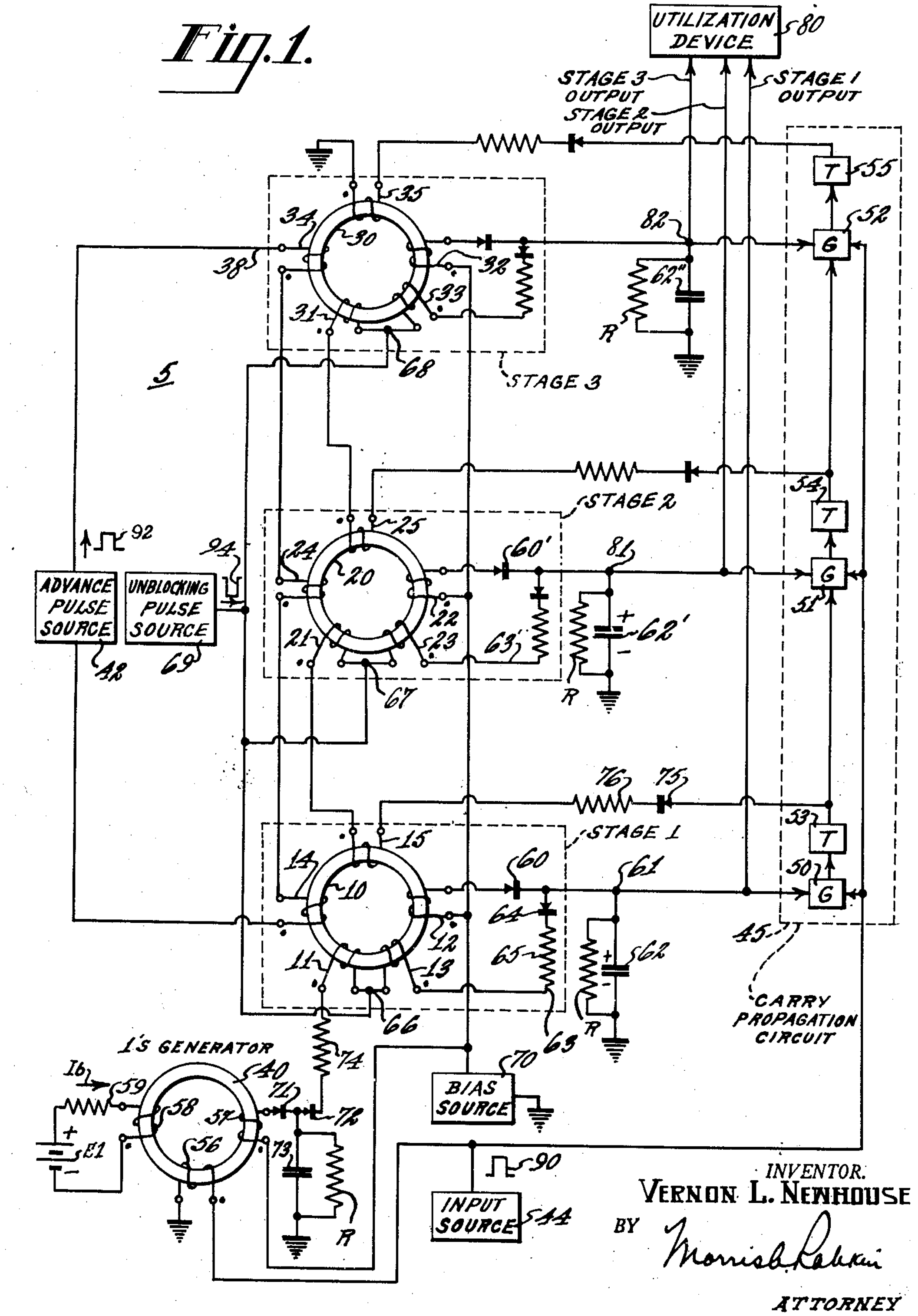
Fig. 1 is a schematic diagram of a counting circuit according to the invention.

Referring to Fig. 1, a counter circuit 5 is provided, for example, with three cascaded stages. The stage 1 is used to store the least significant digit of a three-digit binary number, and the stage 3 is used to store the most significant digit of the binary number. Each stage includes a different one of three magnetic cores 10, 20 and 30. An additional magnetic core 40 is used in operating the first counter stage, as described hereinafter. Each of the cores is fabricated from a magnetic material characterized by a substantially rectangular hysteresis loop. Certain materials, such as molybdenum-permalloy and maganese-magnesium ferrite, exhibit the desired rectangular hysteresis loop.

Figure 2:
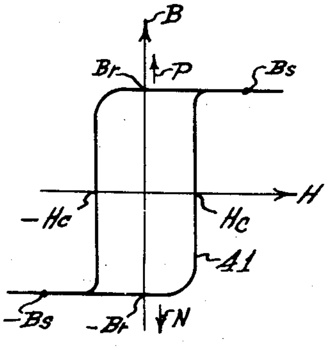
Fig. 2 is a graph, somewhat idealized, of the hysteresis characteristic for a core of substantially rectangular hysteresis loop magnetic material.

A hysteresis loop 41, somewhat idealized, for a rectangular magnetic material is shown in Fig. 2. Each core has two stable remanent states P (positive) and N (negative), and two corresponding saturated states. The two stable remanent states are represented by the points B$r$ and —B$r$, respectively, of the curve 41; and the two corresponding saturated states are represented by the points B$s$ and —B$s$, respectively. Upon removal of an applied magnetizing force, causing a core to be in one of its saturated states B$s$ or —B$s$, the point representing the state of the core moves along a horizontal branch of the curve 41 substantially to the corresponding remanent state represented by the points B$r$ or —B$r$. One remanent state, for example the state P, corresponds to a flux oriented in one sense in a core, for example clockwise (as viewed in the drawing), and the other state N corresponds to flux oriented in the counter-clockwise sense. Substantially no flux change is produced in a core when the core changes between the states represented by the points B$r$ and B$s$, or between the states represented by the points —B$r$ and —B$s$ along a horizontal portion of the hysteresis loop 41. A magnetizing force of one polarity greater than a coercive force H$c$ is required to change the magnetization of a core from remanence in the state N to saturation in the state P along the right branch of the loop 41. An opposite-polarity magnetizing force greater than a coercive force —H$c$ is required to change a core from remanence in the state P to saturation in the state N along the left branch of the loop 41. Each of the cores 10, 20 and 30 (Fig. 1) is capable of storing a single binary digit. The remanence state P of a core, for example, may represent a binary "1," and the remanent state N may represent a binary "0."

The cores 10, 20 and 30 are provided with input windings 11, 21 and 31, output windings 12, 22 and 32, feedback windings 13, 23 and 33, advance windings 14, 24 and 34, and inhibit windings 15, 25 and 35, respectively. The relative sense of linkage of each winding on a core is indicated in drawing by a dot adjacent one of its terminals in accordance with the usual transformer convention. The well-known "right-hand" rule may be used in determining the flux orientation in a core after any applied signals and the directions of induced voltages, if any, produced in the core windings.

An advance line 38 is formed by connecting the advance windings 14, 24 and 34 in series with each other. An advance pulse source 42 is used to apply advance current pulses to the advance line 38.

Input signals to be counted are applied to the counter 5 from an input source 44. The input source 44 may be any suitable device such, for example, as other magnetic circuits or suitable electronic circuits such as a digital computer.

The carry propagation circuit 45 is made up of three "and" gates 50, 51 and 52, and three connected triggerable circuits 53, 54 and 55. Suitable "and" gate circuits, for example, may be of the diode rectifier type shown in Fig. 5 of U.S. Patent No. 2,712,065, issued June 28, 1955, to R. D. Elbourn et al., for Gate Circuitry for Electronic Computers. The first carry "and" gate 50 has two separate inputs and an output, and the other two carry "and" gates 51 and 52 each have three separate inputs and an output. The outputs of the three carry "and" gates 50, 51 and 52 are coupled, respectively, to the inputs of the three triggerable circuits 53, 54 and 55. Each of the triggerable circuits 53, 54 and 55 responds to an input pulse of relatively short duration to produce an output pulse of relatively longer duration. Suitable triggerable circuits include known one-shot multivibrator and blocking-oscillator type circuits. For example, a transistor type circuit suitable for use in the present invention as a triggerable circuit, is illustrated in Fig. 5 of U.S. Patent 2,745,012, issued May 8, 1956, to J. H. Felker, for Transistor Blocking Oscillators. When using the transistorized blocking oscillator of Felker, the triggerable circuit output, for example, may be taken by using an additional winding coupled to the feedback transformer.

The carry "and" gate and the triggerable circuit of any one counter stage together function as a gated amplifier unit. Any other suitable gated amplifier circuit may be used for the illustrative diode "and" gate and transistor blocking-oscillator combination described.

The core 40 is used in the present invention as a 1's generator and is provided with an input winding 56, an output winding 57 and a bias winding 58. A bias source, for example, a battery E1, is connected in series with a current-limiting resistor 59 across the two end terminals of the core 40 bias winding 58.

The interconnection of the various windings and the auxiliary elements of each counter stage is the same. Accordingly, only the stage 1 connections are described in detail. Auxiliary elements of the other stages are designated, where necessary, by similar reference numerals with the addition of a single prime for the stage 2 elements, and a double prime for the stage 3 elements. The upper, unmarked terminal of the core 10 output winding 12 is connected to the anode of a unilateral conducting device, such as a diode 60, whose cathode is connected to a first common junction 61. The common junction 61 has connected thereto one plate of a temporary storage capacitor 62, a second input of the first carry "and" gate 50 and one extreme end of a feedback loop 63. The other plate of the temporary storage capacitor 62 is connected to a source of reference potential, indicated in the drawing by the common ground symbol. A relatively high-impedance leakage resistor R is connected in shunt across each temporary storage capacitor. The feedback loop 63 includes in series a unilateral conducting device, such as a diode 64, a current-limiting resistor 65, and the feedback winding 13 of the core 10. The other extreme end of the feedback loop 63 is connected to a second common junction 66 at the unmarked terminal of the feedback winding 13.

The second common junctions 66, 67 and 68 of the stages 1, 2 and 3 are all connected in parallel to one output of an unblocking pulse source 69. The unblocking pulse source 69 has another output connected to the common ground.

The lower, marked terminals of the output windings 12, 22 and 32 are all connected to one output of a second bias source 70. Another output of the second bias source 70 is connected to the common ground. The second bias source 70 is used to prevent "noise" signals from flowing in the core output windings, as described hereinafter.

The input winding 11 of the stage 1 core 10 has its unmarked terminal connected to the second common junction 66, and has its marked terminal connected through a resistor-diode-capacitor network to the unmarked terminal of the output winding 57 of the core 40. The network connections between the core 40 output winding 57 and the core 10 input winding 11 include a pair of unilateral conducting elements, such as the diodes 71 and 72, connected in series with each other anode to cathode, and a temporary storage capacitor 73 having one plate connected to a junction point between the pair of diodes 71 and 72 and the other plate connected to the common ground. A current-limiting resistor 74 is connected in series between the cathode of the diode 72 and the core 10 input winding 11. The lower, marked terminal of the core 40 output winding 57 is connected to the ungrounded output of the second bias source 70.

The output of the first triggerable circuit 53 is connected to a third input of the second carry "and" gate 51. The output of the first triggerable circuit 53 also is connected in series with a unilateral conducting device, such as a diode 75, and a current-limiting resistor 76 to the unmarked terminal of the core 10 inhibit winding 15. The marked terminal of the core 10 inhibit winding 15 is connected to the marked terminal of the input winding 21 of the stage 2 core 20, which has its unmarked terminal connected to the second common junction 67.

The output of each stage of the counter may be applied to a utilization device 80 with each separate stage being connected to the utilization device 80 at the first common junctions 61, 81 and 82, respectively.

In operation, assume that the counter 5 is reset with each of the cores 10, 20 and 30 in the N remanent state, and that the core 40 is biased into saturation in the N direction by a bias current $I_b$ flowing in its bias winding 58. In the reset condition, the counter 5 is storing a three-digit binary number 000. Input signals, indicated by the positive input pulse 90, are applied to the counter by the input source 44. The input pulses 90 may be applied during predetermined time intervals, or they may be applied at random times. In the latter case, the advance pulse source 42 and the unblocking source pulse 69 are synchronized by any suitable means, not shown, to operate with the randomly-applied input pulses 90. For example, the input pulse 90 may be delayed by any suitable circuitry, and the delayed input pulse applied to actuate the advance pulse source 42 and the unblocking source 69 at suitable times.

Each input pulse 90 enables each of the carry circuit "and" gates 50, 51 and 52 at its first input. The input signal 90 also causes a current flow (conventional) in the core 40 input winding 56 from its marked terminal to its unmarked terminal. The input current flowing in the core 40 input winding 56 produces a magnetizing force of a polarity and of sufficient amplitude to change the core 40 from saturation in the N to saturation in the P direction of magnetization.

Substantially no current flow is produced in the output winding 57 of the core 40, in changing from the N to the P direction, because the voltage induced across the output winding 57 drives the connected diode 71 into non-conduction. However, upon the termination of the input pulse 90, the bias current $I_b$ flowing in the core 40 bias winding 58 returns the core 40 from saturation in the P to saturation in the N direction of magnetization. The resultant voltage induced in the core 40 output winding 57 is in a direction to bias the diode 71 to conduction. Accordingly, a resultant output current flows from the core 40 output winding 57 in a direction to charge the capacitor 73 so as to make its upper plate positive relative to its lower plate. The capacitor 73 is prevented from discharging by a slightly positive bias applied by the unblocking pulse source 69 to each of the second common junctions 66, 67 and 68. Accordingly, the voltage charge stored in capacitor 73 effectively represents an input pulse 90.

Figure 3:
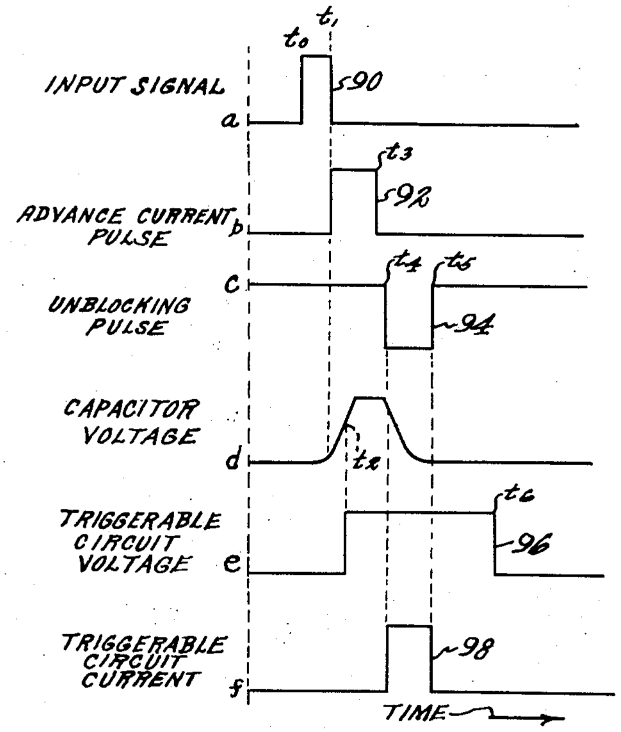
Fig. 3 is a timing diagram useful in explaining the operation of the counting circuit of Fig. 1.

The input pulse 90 is indicated by the positive pulse 90 of a line *a* of the timing diagram of Fig. 3. The input pulse 90 is applied to the counter 5 between the times *t*0 and *t*1. At time *t*1, the advance pulse source 42 is activated and applies a positive advance pulse 92 to the advance line 38. The positive advance pulse applies a magnetizing force to each of the cores 10, 20 and 30. The advance magnetizing force drives each of the cores from its initial remanent condition in the state N to saturation in the same state N. Accordingly, none of the cores 10, 20 and 30 has any appreciable flux change produced therein, and substantially no voltage is produced in any of the counter circuit output windings 12, 22 and 32. The advance current pulse 92 is terminated at time *t*3. Each of the cores 10, 20 and 30 returns to its initial remanent condition in the state N upon termination of the advance magnetizing force.

Between the times *t*4 and *t*5, a negative unblocking pulse 94, indicated in line *c* of Fig. 3, is applied by the unblocking pulse source 69 to each of the second common junctions 66, 67 and 68. The negative potential applied to the second common junction 66 biases the diode 72 to conduction, and the capacitor 73 discharges through the input winding 11 of the first stage core 10. At time *t*5, the unblocking pulse 94 is terminated. The capacitor 73 discharge current changes the core 10 from remanence in the state N to saturation in the state P. Upon termination of the unblocking pulse 94, the core 10 is at remanence in the state P. Accordingly, the first input pulse 90 is effectively stored in the first stage core 10. Each of the other cores 20 and 30 of the stages 2 and 3, respectively, are storing binary "0" signals. Thus, the counter 5 is storing a binary number 001.

Assume, now, that a second input pulse 90 is applied by the input source 44 to the counter 5. The operation of the 1*'s* generator core 40 is the same as for the first input pulse 90. However, the advance current pulse 92 now changes the first stage core 10 from the remanent state P to saturation in the state N. The flux change in the core 10 induces a relatively large voltage across its output winding 12, and a resultant current flows through the diode 60 to charge the temporary storage capacitor 62 so as to make its upper plate positive relative to its lower plate. Substantially no current flows in the feedback loop 63 because the second junction 66 is biased sufficiently positive to maintain the diode 64 non-conductive. The voltage across the capacitor 62 applies a positive enabling signal to the second input of the first carry "and" gate 50. At time *t*2, when the capacitor 62 is charged sufficiently positive, the first carry gate 50 is activated, thereby applying an output signal to the first triggerable circuit 53. The triggerable circuit output voltage thereby is made relatively more positive, as indicated by the positive voltage pulse 96 of line *e*, Fig. 3. However, substantially no current flows from the triggerable circuit 53 output because the second junction 67 of the stage 2 core 20 is biased sufficiently positive by the unblocking pulse source 69 to maintain the diode 75 nonconductive. The output of the first triggerable circuit 53 also applies an enabling signal to the third input of the second carry gate 51. At this time, however, the second input of the second carry gate 51 is relatively low because the temporary storage capacitor 62′ of the stage 2 is uncharged. After the advance pulse 92 is terminated, each of the cores 10, 20 and 30 is in the N remanent state. Following the advance pulse 92, a negative unblocking pulse 94 is applied by the unblocking pulse source 69 to each of the second common junctions 66, 67 and 68. The storage capacitor 73 discharges through the input winding 11 of the stage 1 core 10, as before. The storage capacitor 62 discharges through the feedback loop 63. The current flow in the core 10 feedback winding 13 also tends to change the core 10 to the P direction of magnetization. However, the first triggerable circuit 53 produces an output current, indicated by the positive pulse 98 of line *f* of Fig. 3, between the times *t*4 and *t*5. The current pulse 98 flows through the inhibit winding 15 of the stage 1 core 10, from its unmarked to its marked terminal, and through the input winding 21 of the stage 2 core 20 from its marked to its unmarked terminal. The inhibit current flowing in the core 10 inhibit winding 15 prevents the input current flowing in the input winding 11, and the feedback current flowing in the feedback winding 13, from changing the core 10 to the state P. Accordingly, the core 10 remains magnetized in the N direction. The core 20, however, is changed from its initial remanent state N to saturation in the state P by the current flowing in its input winding 21. The output voltage pulse of the triggerable circuit remains relatively high until a time *t*6 after the termination of the unblocking pulse 94.

Note that the output current of a triggerable circuit 50, 54 and 55 flowing in an inhibit winding produces sufficient magnetizing force to maintain the core receiving the inhibit current magnetized in the N direction despite current flow in either or both its input and its feedback windings. In practice, each inhibit winding is provided with a greater number of turns than either of the input and the feedback windings of the same core. The unblocking pulse 94 controls the duration of the current flow in any of the core windings and, for example, insures that the different magnetizing forces applied to a core are initiated and terminated at substantially the same times.

Accordingly, application of a second input pulse 90 causes the stage 2 core 20 to be magnetized in the remanent state P, representing a binary "1" digit, and each of the other cores 10 and 30 is magnetized in the remanent state N, representing a binary "0" digit. Accordingly, the counter 5 now stores the binary number 010.

A third input pulse 90 operates the core 40, as before, to charge the capacitor 73. The next advance pulse 92, however, does not cause any output in the core 10 output winding 12 because substantially no flux change is produced in the core 10 in changing from remanence to saturation in the state N. However, the stage 2 core 20 is changed from remanence in the state P to saturation in the state N by the advance current pulse 92. The flux change in the stage 2 core 20 charges its temporary storage capacitor 62′ so as to make its upper plate positive relative to its lower plate. The positive voltage of the capacitor 62′ enables the second carry at gate 51 and its second input. However, the first carry "and" gate 50 is not activated because the temporary storage capacitor 62 is uncharged. Accordingly, the second carry "and" gate 51 is not enabled at its third input which is connected to the output of the first triggerable circuit 53.

The next unblocking pulse 94, therefore, discharges the capacitor 73 through the input winding 11 of the core 10 and discharges the capacitor 62′ through the feedback winding 23 of the second core 20. The current flowing in the core 20 feedback winding 23 changes the stage 2 core 20 from the N to the P state of magnetization. The diode 60′, connected to the output winding 22 of the core 20, is made non-conductive by the voltage induced in the output winding 22 when the core 20 changes from the N to the P direction of magnetization.

Accordingly, after the third input pulse 90, both the cores 10 and 20 are magnetized in the state P, each representing a binary "1" digit, and the core 30 remains magnetized in the initial state N, representing a binary "0" digit. Therefore, the counter 5 is now storing the binary number 011.

A fourth input pulse 90 charges the capacitor 73, as before. The next advance pulse 92 changes the cores 10 and 20 from the state P to the state N, thereby charging the capacitors 62 and 62′. The charged capacitors 62 and 62′ respectively enable the first and second carry "and" gates 50 and 51 at their second inputs. The second carry "and" gate 51 also is enabled at its third input by the output of the first triggerable circuit 53. The next unblocking pulse 94 discharges the capacitor 73 through the input winding 11 of the core 10, and discharges the capacitors 62 and 62′ through the first and second stage feedback loops 63 and 63′, respectively. The output current of the first triggerable circuit 53 flowing, at the same time, in the core 10 inhibit winding 15, holds the core 10 in the N direction of magnetization. Similarly, the output current of the second triggerable circuit 54 flowing, at the same time, in the core 20 inhibit winding 25, holds the second core 20 in the N direction of magnetization. However, the output current of the second triggerable circuit 54 also flows through the core 30 input winding 31 to change the core 30 from the N to the P direction of magnetization. Accordingly, after the fourth input pulse 90, the cores 10 and 20 are each magnetized in the N remanent state, and the core 30 is magnetized in the P remanent state. Accordingly, after the fourth input signal is received, the counter 5 is storing the binary number 100. The operation continues in similar manner for succeeding input pulses. The eighth input pulse 90 causes all the cores to be reset to their N remanent states to return the counter 5 to its reset condition.

The second bias source 70 is used as a noise-suppression means to prevent any appreciable current flow in an output winding when that core is driven from remanence in the state N to saturation in the same state N by an advance pulse 92. Thus, the second bias source 70 is arranged to provide a slightly negative bias on each of the diodes 60, 60′ and 60″ which are coupled to the respective input windings 12, 22 and 32. Consequently, a minimum amplitude voltage in excess of the bias voltage must be induced in an output winding before any current flow is produced therein. An article by V. L. Newhouse and N. S. Prywes, entitled "High-Speed Shift Registers Using One Core Per Bit," and published in the September 1956 issue of the Transactions of Electronic Computers, vol. EC–5, No. 6, pages 114–120, describes the operation of a bias source used for noise-suppression purposes.

Note that the output signal of a core is used both in resetting the core from the state P to the state N, and in setting the core from the state N to the state P. Thus, when a core is in its reset condition (the state N), it automatically returns to its reset condition unless a new input signal is applied to its input winding. Also, when a core is in its set condition (the state P), it automatically returns to its set condition unless a new carry signal is applied to its inhibit winding. Accordingly, the single core and gated amplifier of a stage effectively function as a flip-flop unit. In addition, the gated amplifier also serves as a part of the high-speed carry propagation circuit.

Also note that the response time for the counter 5 is the same whether or not carry digits are generated by one or more of its stages. Thus, the propagation of a carry digit through the carry circuit 45 is independent of the speed of operation of the cores used to store the binary digits.

The count stored in the counter also can be read out non-destructively. If no input pulse 90 is applied, each of the carry "and" gates 50, 51 and 52 is not enabled at its first input. Thus, an advance pulse 92 reads out the information stored in the cores 10, 20 and 30 to the temporary storage capacitors 62, 62′ and 62″. The information read out is represented by the voltage levels of the first common junctions 61, 81 and 82. The next unblocking pulse 94 discharges the capacitors 62, 62′ and 62″, through the respective feedback loops 63, 63′ and 63″, to restore the cores 10, 20 and 30 to their initial remanent conditions.

There have been described herein improved magnetic-core counter circuits employing a single magnetic core for each counter stage and capable of relatively high-speed operation. Any desired pattern of binary digits may be stored in the counter at any given time. The stored pattern may be read out non-destructively, or may be altered by adding a new binary digit to the stored pattern. The signals to be counted can be inserted in periodic or in aperiodic fashion.

What is claimed is:

1. In an "$n$" stage counter circuit, the combination comprising respectively "$n$" magnetic cores of substantially rectangular hysteresis loop material, said cores each having separate input, output, feedback, and inhibit windings linked thereto, "$n$" temporary storage devices connected respectively to the output windings of said cores, "$n$" feedback circuits, the "$n$th" one of said feedback circuits being connected between the "$n$th" temporary storage device and the feedback winding of the "$n$th" one of said cores, a carry propagation circuit having "$n$" gated amplifier stages, each stage having a plurality of inputs and an output, the "$n$th" gated amplifier stage having one input connected to the "$n$th" temporary storage means, and having another input connected to the output of the "$n-1$th" gated amplifier, and the "$n$th" gated amplifier having its output connected serially to the inhibit winding of the "$n$th" core and to the input winding of the "$n+1$th" core, and further having its output connected directly to the said other input of the "$n+1$th" gated amplifier, and means for applying an input signal to all said gated amplifier stages at the same time.

2. In a counter circuit, the combination comprising a plurality of magnetic cores of substantially rectangular hysteresis loop material in order, each of said cores each having separate input, output, feedback, and inhibit windings linked thereto, a carry propagation circuit comprising a like plurality of gated amplifier circuits corresponding respectively to said cores, each of said gated amplifier circuits having a plurality of inputs and an output, feedback circuits respectively connected between the output and feedback windings of said cores, each of said output windings being coupled to a first of said inputs of a corresponding one of said gated amplifier circuits, each of said outputs of said gated amplifier circuits being coupled to a second of said inputs of the next succeeding gated amplifier circuit, and each of said outputs being further connected to the inhibit winding of the corresponding core and to the input winding of the next succeeding core, and means for applying an input signal simultaneously to all said gated amplifier circuits.

3. In a counter circuit, the combination of a first and second magnetic core each having two stable magnetic states, each of said cores having an input winding, an output winding, a feedback winding and an inhibit winding, a triggerable circuit means driven by a logical "and" gate, said "and" gate having one input connected to receive signals from the output winding of said first core, a signal storage means also receiving signals from said output winding of said first core, said storage means coupled to apply signals to said feedback winding of said first core after a time delay, said triggerable circuit driving both the inhibit winding of said first core and the input winding of said second core, and means for coupling input signals to another input of said "and" gate.

4. In a counter circuit, the combination as claimed in claim 3, including a point of common reference potential, said storage means including a capacitor having one plate coupled to said first core output winding and having another plate connected to said point of common reference potential.

5. In a counter circuit, the combination as claimed in claim 3, wherein said triggerable circuit means comprises a blocking oscillator circuit for producing output pulses lengthened with respect to input pulses thereof.

6. In a counter circuit, the combination of a first and second magnetic core each having two stable magnetic states, each of said cores having an input winding, an output winding, a feedback winding and an inhibit winding, a pulse generator connected to one end of said input winding of said first core, said pulse generator being responsive to input signals to said counter circuit, a gated amplifier circuit comprising a triggerable circuit having an input and an output, a logical "and" gate, said "and" gate having one input connected to receive signals from the output winding of said first core and having another input responsive to said input signals, and having an output connected to the input of said triggerable circuit, a signal storage means also connected to said output winding of said first core, and a feedback circuit connected to said storage means, said feedback circuit including said feedback winding of said first core, said triggerable circuit output driving both the inhibit winding of sad first core and the input winding of said second core.

7. In an "$n$" stage counter circuit, the combination comprising respectively "$n$" magnetic cores of substantially rectangular hysteresis loop material in order, said cores each having separate input, output, feedback, and inhibit windings linked thereto, "$n$" temporary storage devices connected respectively to the output windings of said cores, "$n$" feedback circuits, the "$n$th" one of said feedback circuits being connected between the "$n$th" temporary storage device and the feedback winding of the "$n$th" one of said cores, a carry propagation circuit having "$n$" gated amplifier stages, each stage having a plurality of inputs and an output, the "$n$th" gated amplifier stage having one input connected to the "$n$th" temporary storage means, and having another input connected to the output of the "$n-1$th" gated amplifier, and having its output connected serially to the inhibit winding of the "$n$th" core and the input winding of the "$n+1$th" core, means for applying an input signal to a further input of all said gated amplifier stages at the same time, and a utilization device having "$n$" inputs respectively coupled to said "$n$" temporary storage devices.

8. In an "$n$" stage counter circuit, the combination comprising respectively "$n$" magnetic cores of substantially rectangular hysteresis loop material in order, said cores each having separate input, output, feedback, inhibit and advance windings linked thereto, "$n$" temporary storage devices connected respectively to the output windings of said cores, "$n$" feedback circuits, the "$n$th" one of said feedback circuits being connected between the "$n$th" temporary storage device and the feedback winding of the "$n$th" one of said cores, a carry propagation circuit having "$n$" gated amplifier stages, each stage having a plurality of inputs and an output, the "$n$th" gated amplifier stage having one input connected to the "$n$th" temporary storage means, and having another input connected to the output of the "$n-1$th" gated amplifier, and having its output connected serially to the inhibit winding of the "$n$th" core and the input winding of the "$n+1$th" core, means for applying an input signal to a further input of all said gated amplifier stages at the same time, and means for applying an advance pulse to all said advance windings at the same time.

9. An "$n$" stage counter circuit comprising respectively "$n$" magnetic cores of substantially rectangular hysteresis loop material in order, said cores each having separate input, output, feedback, advance and inhibit windings linked thereto, "$n$" temporary storage devices and "$n$" diode rectifiers, said "$n$" temporary storage devices being connected via said "$n$" diode rectifiers respectively to the output windings of said cores, "$n$" feedback circuits, "$n$" common junctions, said feedback and said input windings of any one of said cores each being connected to one of said common junctions, the "$n$th" one of said feedback circuits being connected between the "$n$th" temporary storage device and the feedback winding of the "$n$th" one of said cores, a carry propagation circuit having "$n$" gated amplifier stages, each stage having a plurality of inputs and an output, the "$n$th" gated amplifier stage having one input connected to the "$n$th" temporary storage means, and having another input connected to the output of the "$n-1$th" gated amplifier, and having its output connected serially to the inhibit winding of the "$n$th" core and the input winding of the "$n+1$th core, means for applying an input signal to a further input of all said gated amplifier stages at the same time, a pulse generator means coupled to the input winding of the lowest-order core, means for applying each said input signal to said pulse generator means, means for applying an advance signal to all said advance windings at the same time, and means for applying an unblocking signal to all said common junctions after said advance signal is terminated.

10. An "$n$" stage counter circuit comprising respectively "$n$" magnetic cores of substantially rectangular hysteresis loop material in order, said cores each having separate input, output, feedback, and inhibit windings linked thereto, "$n$" temporary storage devices connected respectively to the output windings of said cores, "$n$" feedback circuits, the "$n$th" one of said feedback circuits being connected between the "$n$th" temporary storage device and the feedback winding of the "$n$th" one of said cores, a carry propagation circuit having "$n$" gated amplifier stages, each stage having a plurality of inputs and an output, the "$n$th" gated amplifier stage having one input connected to the "$n$th" temporary storage means, and having another input connected to the output of the "$n-1$th" gated amplifier, and having its output connected in a series circuit to the inhibit winding of the "$n$th" core and the input winding of the "$n+1$th" core, means for applying an input signal to a further input of all said gated amplifier stages at the same time, and an unblocking pulse source having an output connected to all said feedback circuits and to all said series circuits, said unblocking pulse source operating to prevent current flow in said feedback and said series circuits except when an output signal appears on said unblocking source output.

References Cited in the file of this patent

UNITED STATES PATENTS

| | | |
|---|---|---|
| 2,794,130 | Newhouse et al. | May 28, 1957 |
| 2,795,776 | Epstein | June 11, 1957 |